United States Patent [19]

Marshall

[11] Patent Number: 4,634,527
[45] Date of Patent: Jan. 6, 1987

[54] FLUID FILTER ELEMENT WITH ANNULAR SEALING MEANS

[76] Inventor: Dennis A. G. Marshall, Greets Cottage, Friday Street, Warnham, Near Horsham, Sussex, England

[21] Appl. No.: 844,239

[22] Filed: Mar. 25, 1986

Related U.S. Application Data

[63] Continuation of Ser. No. 630,841, Jul. 13, 1984, abandoned.

[30] Foreign Application Priority Data

Jul. 15, 1983 [GB] United Kingdom ............... 8319167

[51] Int. Cl.⁴ ..................... B01D 27/08; B01D 35/30; B01D 39/10
[52] U.S. Cl. ..................................... 210/232; 55/387; 55/498; 55/502; 210/282; 210/446; 210/450; 210/451; 210/489; 210/502.1
[58] Field of Search ............... 55/387, 498, 502, 513, 55/518; 210/232, 238, 282, 445, 446, 447, 448, 450, 451, 452, 502.1

[56] References Cited

U.S. PATENT DOCUMENTS

| | | |
|---|---|---|
| 752,873 | 2/1904 | Sweeny ............................ 210/238 |
| 2,605,901 | 8/1952 | Morrison ......................... 210/450 |
| 2,924,336 | 2/1960 | Fulton ............................. 210/450 |
| 2,973,832 | 3/1961 | Cook ................................ 55/502 |
| 2,988,170 | 6/1961 | Pritchard ......................... 55/502 |
| 3,045,830 | 7/1962 | Fulton ............................. 210/450 |
| 3,512,940 | 5/1970 | Shapiro ............................ 210/450 |
| 3,675,777 | 7/1972 | Heskett ........................... 210/232 |
| 3,850,813 | 11/1974 | Pall ................................. 210/232 |
| 4,061,807 | 12/1977 | Shaler ............................. 210/502.1 |
| 4,082,071 | 4/1978 | Jones .............................. 55/502 |
| 4,123,362 | 10/1978 | Mansouri ........................ 210/232 |
| 4,132,641 | 1/1979 | Elsworth ......................... 210/238 |
| 4,208,289 | 6/1980 | Bray ................................ 210/450 |
| 4,349,363 | 9/1982 | Patel ............................... 55/502 |
| 4,402,828 | 9/1983 | Edens .............................. 210/450 |
| 4,442,003 | 4/1984 | Holt ................................ 210/445 |

FOREIGN PATENT DOCUMENTS 2089237  6/1982  United Kingdom ............... 210/238

Primary Examiner—Ernest G. Therkorn
Attorney, Agent, or Firm—Berman, Aisenberg & Platt

[57] ABSTRACT

The invention is concerned with a fluid filter element having at least one annular sealing member of neoprene or similar material which is sufficiently flexible to be flexed under pressure out of its radial disposition when the filter element is inserted in an appropriate holder.

12 Claims, 4 Drawing Figures

FLUID FILTER ELEMENT WITH ANNULAR SEALING MEANS

This is a continuation of application Ser. No. 630,841 filed July 13, 1984, now abandoned.

This invention relates to fluid filter elements and is especially concerned with filter elements comprising a generally cylindrical casing adapted to be plugged into a wall or into a cylindrical or tubular holder.

In such filter elements it is necessary to provide their casings with some kind of sealing means so that a fluid-tight seal is made between the casing and the wall or other holder which is receiving the filter element. Hitherto these sealing means have usually taken the form of O-rings which are let into annular grooves on the casing and which are bonded to the casing so that they do not get displaced. Such seals, however, require the filter element to be pushed into the wall or other holder with considerable force, and a similar force is required to remove the filter element therefrom.

In those installations where power means of restricted power are used to insert one or more filter elements into a wall or other holder, it is sometimes found that the force required for such insertion or removal of the filter element is more than the power means can cope with. It is, therefore, an aim of the present invention to provide a form of seal which has excellent sealing properties but which permits the filter element to be inserted into a wall or other holder and be removed therefrom without exceeding the power limitations of the power means for such insertion and removal.

With this aim in view, the invention is directed to a fluid filter element having a casing, flange, ring or equivalent part which is adapted for insertion in a wall or other holder and which is provided with at least one annular sealing member of soft flexible sealing material, for example, neoprene, having its inner peripheral portion rooted in the casing or equivalent part and its outer peripheral portion projecting radially therefrom, the cross-section of the sealing member being of substantially rectangular form with a width greater than its thickness so that the sealing member as a whole resembles a thin annular disc with the outer peripheral portion of the sealing member being easily flexed under pressure out of its radial disposition.

BRIEF DESCRIPTION OF THE DRAWINGS

Some example of fluid filter elements in accordance with the invention are shown in the accompanying drawings, in which.

DESCRIPTION OF THE PREFERRED EMBODIMENTS

Figure 1:
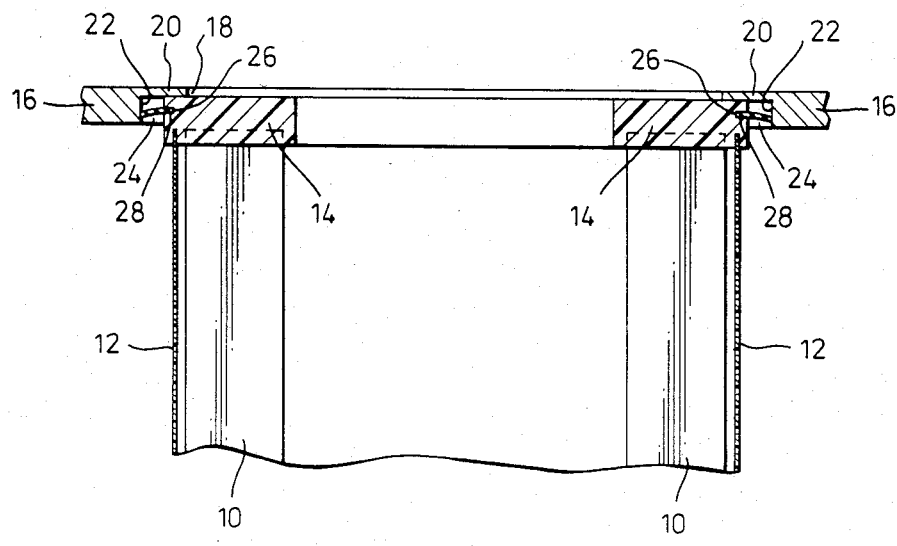
FIG. 1 is an axial section through part of one form of filter element adapted to be inserted into a wall.

The fluid filter element shown in FIG. 1 comprises an annulus 10 of filtering material which here takes the form of pleated paper. The filtering material 10 is surrounded by a thin-mesh stainless steel cylindrical screen 12 which not only protects the filtering material but also serves as a spark arrester. The filtering material 10 and the surrounding screen 12 are both sealed at one end in a flange or ring 14 of polyurethane resin or a polyester or epoxy resin which is moulded on to the filtering material 10 and the screen 12.

The flange 12 of the filter element is adapted to be received by a wall 16 serving as a holder for the filter element. The wall 16 has an opening 18 and a shoulder portion 20 forming a recess 22. The outer diameter of the flange 14 is slightly less than the diameter of the recess 22 so that an annular gap 24 is formed between them. This gap is sealed by an annular seal 26 of neoprene the inner peripheral portion of which is received and held by bonding in an annular slot 28 in the flange 14 while the outer peripheral portion of the seal projects radially from the flange. The annular seal 26 is of rectangular cross-section with a width greater than its thickness and has an outer peripheral portion which is sufficiently flexible that the amount of force necessary to insert the flange 14 into the wall 16 is very low when compared with filter means having O-ring seals. It will be appreciated that the outer diameter of the annular seal 26 will be slightly greater than the diameter of the recess 22 in the wall 16 so that the seal is flexed when the filter element is inserted in the wall. Once inserted, the pressure of fluid passing through the filter element will cause the annular seal 26 to make even tighter sealing engagement with the wall 16.

Figure 2:
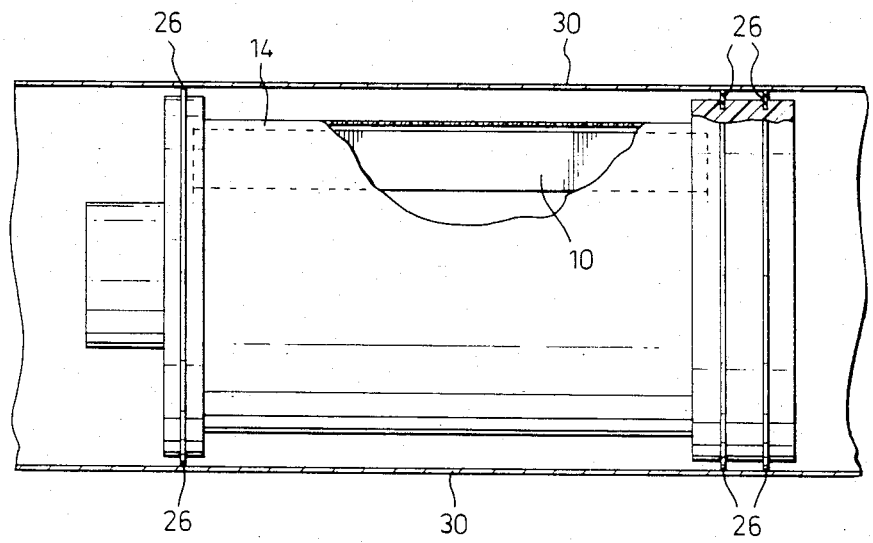
FIG. 2 is a vertical section through a second form of filter element adapted to be inserted in a cylindrical holder.

FIG. 2 shows an alternative form of filter element in which the casing 14 is of tubular form so that the filter element can be received in a tubular holder 30. In order to provide a good seal between the casing 14 and the case 30 while allowing the filter element to be slid along the filter without the expenditure of great force, flexible annular seals 26 of the same construction as the seal 26 shown in FIG. 1 are held in corresponding annular slots in the external surface of the casing 14 adjacent the ends of the latter.

Figure 3:
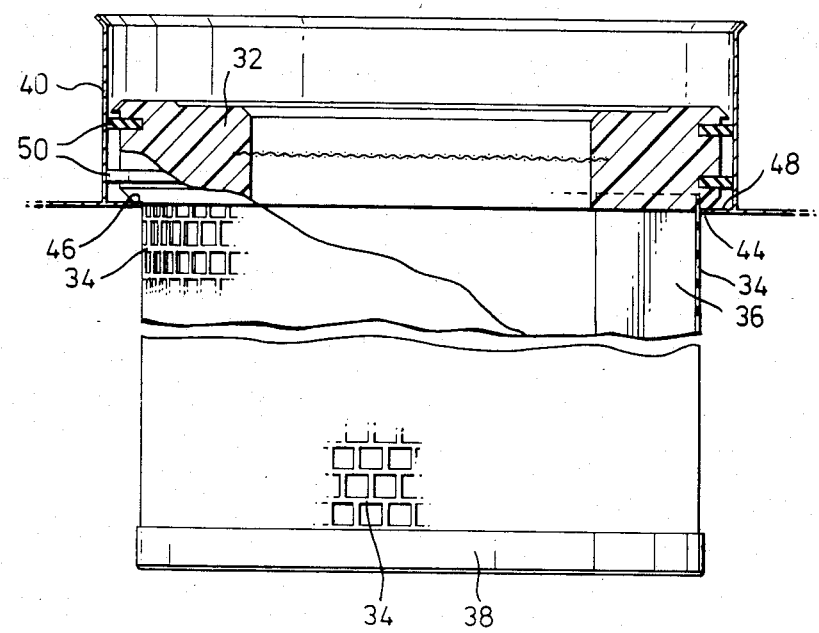
FIG. 3 is a view similar to FIG. 1 of a third form of filter element adapted to be inserted into an annular spigot or sleeve on a wall.

FIG. 3 shows a third form of filter element having a flange or ring 32 of polyurethane resin or a polyester or epoxy resin from which a cylindrical screen 34 depends. The screen 34 is made of metal and serves to contain an annulus 36 of pleated filtering paper in the same way as the filter element shown in FIG. 1. The lower end of the screen 34 is closed by an end wall 38, while the upper end of the screen, together with the upper end of the annulus 36 of pleated filtering paper, is embedded in the material of the flange or ring 32.

The filter element shown in FIG. 3 is adapted to be inserted into an annular spigot or sleeve 40 fixed to a wall 42 which is provided with a circular opening 44 having a diameter which is slightly larger than the outer diameter of the screen 34 while being of slightly smaller diameter than the outer diameter of the flange or ring 32. In normal operation of the filter element, the lower edge portion 46 of the flange or ring 32 rests on the shoulder 48 bounding the hole 44 in the wall 42. In order to seal the flange or ring 32 within the spigot or sleeve 40, the outer cylindrical surface of the flange or ring 32 is provided with two spaced-apart annular seals 50 of neoprene having the same function and being of the same construction as the seals 26 shown in FIGS. 1 and 2. Here, as in FIGS. 1 and 2, the seals 50 provide a good seal between the flange or ring 32 and the annular spigot or sleeve 40 while allowing the filter element to be moved into and out of its operating position in the wall without the expenditure of great force axially of the filter element.

Figure 4:
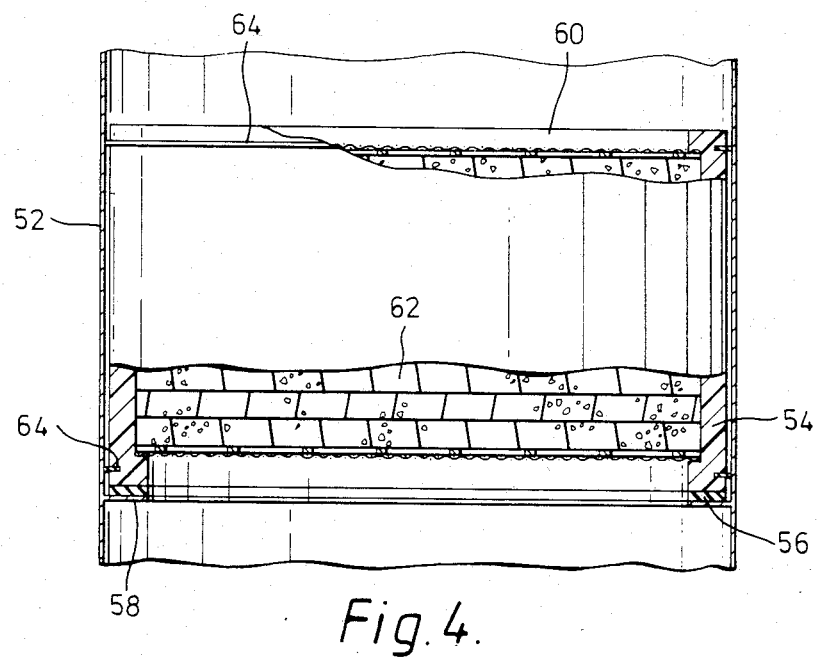
FIG. 4 is a section through a fourth form of filter element adapted to be inserted in a cylindrical holder or tube.

The filter element shown in FIG. 4 is adapted to be inserted in a cylindrical holder or tube 52. For this purpose, it comprises a cylindrical casing 54 which is provided at one end with a flexible annular seal 56 of neoprene or equivalent material which abuts against an annular shelf or flange 58 formed internally on the cylindrical holder or tube 52. Adjacent each end of the cylindrical casing 54 of the filter element is a screen 60, 62, and between these screens are plies of cellular material containing activated carbon particles for filtering air which passes axially through the filter element. The construction and arrangement of these plies of cellular material has been described in other Patents Applications and Patents in my name and will not therefore be described in detail here.

In order to permit the filter element to be slid into and out of the cylindrical holder or tube 52 without the expenditure of great force while ensuring a good fluid-tight seal between them, the outer surface of the casing 54 is provided with a pair of annular seals 64 of the same construction as those shown at 26 and 50 in FIGS. 1 to 3, respectively.

Preferably, the casing 54 in the filter element shown in FIG. 4 is of spun-moulded construction to permit the peripheral portions of the plies of cellular material to be incorporated into the material of the casing 54 while the latter is still in a liquid condition during the moulding process. The casing 54 is accordingly made of a mouldable synthetic plastics material.

The present invention finds particular application in those installations where mechanical hands are used to insert fluid filter elements into a wall or other holder and to remove the elements therefrom.

I claim:

1. A fluid filter comprising, a holder and a fluid filter element received in said holder, said fluid filter element comprising an annular part and an annular sealing member separate from said annular part and of soft, flexible sealing material, said annular part having a diameter smaller than that of said holder and a groove in an external surface, an inner peripheral portion of said annular sealing member being received and rooted in said annular groove, said annular sealing member being substantially rectangular with a width greater than its thickness and having an outer peripheral portion with a diameter larger than that of said holder and projecting radially outward from said external surface and engaging an inner surface of said holder to form a seal between said inner surface and said annular sealing member.

2. A fluid filter according to claim 1, in which said annular part comprises a casing of said element.

3. A fluid filter according to claim 1, in which said annular part comprises a flange of said element.

4. A fluid filter according to claim 3 comprising an annulus of filtering material in the form of pleated paper which is surrounded by a cylindrical metal screen serving to protect the filtering material and to act as a spark arrester, the filtering material and the surrounding screen being both sealed at one end in a ring of synthetic plastics material which is moulded on to the filtering material and the screen, the flange of the filter element being received by a wall serving as a holder for the filter element and being provided with said annular sealing member on its outer peripheral surface.

5. A fluid filter according to claim 3, in which said flange is received by an annular spigot on a wall of said holder provided with an opening through which the screen of the filter element can pass, the flange being provided with two spaced-apart sealing members on its outer peripheral surface.

6. A fluid filter according to claim 1, in which said annular sealing member is made of neoprene.

7. A fluid filter according to claim 1, in which said annular part comprises a casing of tubular form, there being at least two annular sealing members at different points along the external surface of the casing.

8. A fluid filter according to claim 7, in which the casing is of spun-moulded construction and is made of a mouldable synthetic plastics material, and in which a peripheral portion of filtering material within the casing is incorporated into the material of the casing while the latter is still in a liquid condition during the moulding process.

9. A fluid filter according to claim 1 comprising filtering material in the form of plies of cellular material containing activated carbon particles.

10. A fluid filter according to claim 1 wherein said annular sealing member is bonded to said annular groove.

11. A fluid filter element comprising an annular part adapted to be inserted in a holder, at least one annular sealing member of soft flexible sealing material supported on an external surface of said annular part, an annular groove in said external surface of said annular part serving to receive, as a close fit, an inner peripheral portion of said annular sealing member whereby the said portion is firmly rooted in said annular part, said annular sealing member having an outer peripheral portion projecting radially from said external surface of the annular part for engaging an inner wall of said holder, the cross-section of said sealing member being substantially rectangular with a width greater than its thickness whereby the sealing member as a whole comprises a thin annular disc with the outer peripheral portion thereof being easily flexed under pressure out of its radial disposition when said annular part is inserted in said holder, said annular part comprising a flange of said element, said annular sealing member being made of neoprene, an annulus of filtering material in the form of pleated paper which is surrounded by a cylindrical metal screen serving to protect the filtering material and to act as a spark arrester, the filtering material and the surrounding screen both being sealed at one end in a ring of synthetic plastics material which is moulded onto the filtering material and the screen, the flange of the filter element being adapted to be received by a wall serving as a holder for the filter element and being provided with an annular sealing member on its outer peripheral surface, said flange being adapted to be received by an annular spigot on a wall provided with an opening through which the screen of the filter can pass, the flange being provided with two spaced-apart sealing members on its outer peripheral surface.

12. A fluid filter element comprising an annular part adapted to be inserted in a holder, at least one annular sealing member of soft flexible sealing material supported on an external surface of said annular part, an annular groove in said external surface of said annular part serving to receive, as a close fit, an inner peripheral portion of said annular sealing member whereby the said portion is firmly rooted in said annular part, said annular sealing member having an outer peripheral portion projecting radially from said external surface of the annular part for engaging an inner wall of said holder, the cross-section of said sealing member being substantially rectangular with a width greater than its thickness whereby the sealing member as a whole comprises a thin annular disc with the outer peripheral portion thereof being easily flexed under pressure out of its radial disposition when said annular part is inserted in said holder, said annular part comprising a casing of said element, said annular member being made of neoprene, said annular part comprising a casing of tubular form which is receivable in a tubular holder, there being at least two annular sealing members at different points along the external surface of the casing, the casing being of spun-moulded construction and made of a mouldable synthetic plastics material, and in which a peripheral portion of filtering material within the casing is incorporated into the material of the casing while the latter is still in a liquid condition during the moulding process.

* * * * *